United States Patent [19]

Rickle

[11] Patent Number: 4,673,755

[45] Date of Patent: Jun. 16, 1987

[54] NONREACTIVE CLASS OF SURFACTANTS FOR FOAMING AGENTS IN PLASTICS

[75] Inventor: Gregory K. Rickle, Midland, Mich.

[73] Assignee: The Dow Chemical Company, Midland, Mich.

[21] Appl. No.: 758,944

[22] Filed: Jul. 25, 1985

[51] Int. Cl.⁴ ................................................ C07F 7/08
[52] U.S. Cl. .................................... 556/489; 521/110; 526/75; 526/84; 526/86; 526/87
[58] Field of Search .................... 556/489; 526/75, 84, 526/86, 87

[56] References Cited

U.S. PATENT DOCUMENTS

| | | | |
|---|---|---|---|
| 2,570,551 | 10/1951 | Hatcher et al. | 556/489 X |
| 2,642,415 | 6/1953 | Winslow | 556/489 X |
| 2,982,757 | 5/1961 | Lewis | 556/489 X |
| 4,381,377 | 4/1983 | Kampf et al. | 556/489 X |

Primary Examiner—Paul F. Shaver

[57] ABSTRACT

A new class of hydrocarbon foaming agents which are block copolymers, one block of which is a styrene derivative, the other a vinylsilane derivative. Said hydrocarbon foaming agents are nonreactive with common anionic initiators.

7 Claims, No Drawings

NONREACTIVE CLASS OF SURFACTANTS FOR FOAMING AGENTS IN PLASTICS

BACKGROUND OF THE INVENTION

One of the problems with the polystyrene reaction injection molding systems is shrinkage of the foam before polymerization completes to the degree necessary for the polymer to retain its shape. Commercially available surfactants such as polymethylphenylsiloxane and block copolymer styrene-dimethylsiloxane enable the foam to retain the mold's shape. However, these surfactants react with commonly used initiators requiring more initiator and reducing the product's molecular weight.

SUMMARY OF THE INVENTION

A novel class of block copolymer of styrene type monomer and vinyltrihydrocarbon substituted silane, with blowing agents, were found to solve both the reaction and the low molecular weight problems in reaction injection molding. Weight average molecular weights over 200,000 are easily obtained using the block copolymer.

DETAILED DESCRIPTION OF THE INVENTION

The new surfactants used with foaming agents are thought to be AB type block copolymers. A preferred method of manufacture is to polymerize the alkenyl aromatic monomer such as styrene then add the vinylorganosilane to at least one end of the alkenyl aromatic polymer such as styrene by polymerizing it on one end of the living alkenyl aromatic polymer.

(a) Polymers of the present invention having the formula:

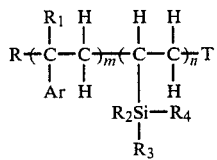

wherein Ar is selected from the group consisting of phenyl, alkyl substituted phenyl, napthyl alkyl substituted alkyl groups wherein the alkyl substitution contains from 1 to 20 carbon atoms;

R=alkyl radical containing 1–10 carbon atoms;
$R_1$=Hydrogen or methyl;
$R_2$, $R_3$, $R_4$ are individually selected from the group consisting of alkyl and cycloalkyl groups varying from 1–10 carbon atoms, phenyl and alkyl or cyclo alkyl substituted phenyl;
m and n vary independently among the positive integers, preferably less than about 5,000 and more preferably m varies among the integers between 90 and 270 and n varies among the integers between 10 and 30;
T is the radical obtained from chain termination.

For producing Block B, vinyltriorganosilanes of the following structure are used:

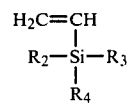

where $R_2$, $R_3$ and $R_4$ represent identical or different radicals, for example, not by way of limitation: alkyl radicals of normal, branched or cyclic structure with one to sixteen carbon atoms, methyl, butyl, cyclohexyl aryl or substituted aryl or naphthenic radicals which include monomers such as vinylethyldimethylsilane, vinylbutyldi-methylsilane, vinyltrimethylsilane and vinylphenyl-dimethylsilane, as well as copolymers of said monomers and styrene or its derivatives can be used for producing Block B.

The block copolymers of type A-B are produced, according to the invention, by anionic block copolymerization of conjugated dienes and/or styrene and polyvinyltriorganosilanes in the presence of lithium-based initiators in an organic solvent.

Under the above conditions there are produced nonelastomeric or elastomeric high-molecular compounds of the following general structure:

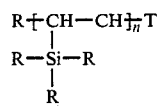

The process of producing silicon-containing block copolymers of the type A-B can be carried out in the presence of the following anionic polymerization initiators: metallic lithium, lithium alkyls or other lithium organic compounds. The alkyls in said lithium alkyls are preferably branched, e.g. isopropyllithium, sec. butyllithium, isobutyllithium, isoamyllithium, etc.

Block copolymerization is carried out in hydrocarbon solvents: lower alkanes of normal and iso-structure containing from 5 to 10 carbon atoms, aromatic and cycloaromatic hydrocarbons or mixtures of the same, e.g. hexane, cyclohexane, benzene, toluene, or mixtures of the same, etc.

In the presence of metallic lithium or lithium-organic compounds in the above-mentioned hydrocarbon solvents there is obtained block A. Polymerization is carried out at temperatures from 0° to 70° C.

The concentration of the initiator can vary within a wide range, depending on the required molecular weight of the block copolymer, e.g., from 0.001 mol/l. to 0.1 mol/l.

Polymerization can be carried out in vacuum (from $10^{-1}$ to $10^{-5}$ mm. of mercury) or in an atmosphere of a dry and purified inert gas, e.g. nitrogen, argon, etc.

The block copolymer of the general formula A-B is produced by the consecutive addition of monomers.

The consecutive process of adding monomers is carried out as follows.

In the first stage there is produced in the presence of lithium alkyls and an organic solvent a block A polymer having a terminal lithium ion, a so-called living polymer. This stage is completed when the free initiator and monomer are completely exhausted. In the second stage there is added a vinyl silane which grows on the polymeric chains of block A, forming block B. Block B also has a lithium ion at the ends of the polymeric chains, and after completion of polymerization of the block copolymer, the polymer is terminated with an active hydrogen compound such as methanol, isopropanol and the like. The polymer solution may then be washed to remove water soluble residues and the polymer recovered by evaporation of the solvent.

Although there is no known reason to limit the extent of polymerization, most embodiments of the invention will have each block preferably comprised of less than about 5,000 monomer units of each. Desirable polymers of the AB configuration have a weight average molecular weight of about 10,000 to 30,000 grams per mole and a polysilane content of about 5 to about 10 percent.

There are no known limits on the amount of the surfactant used to assist foaming. While enough surfactant has to be used to be operable, there is no reason to use much more than necessary to achieve the foaming stabilization required. For some of the invention's embodiments, about 0.5 to 1.5 weight percent was the preferred concentration of the surfactant.

Use of Surfactant

The surfactant can be added to a mixture of the desired monomer or monomers, crosslinker, or other desired organic materials. This mixture can be saturated with an inert gas such as nitrogen. The new mixture is then initiated by an anionic initiator and foamed simultaneously by dropping the pressure, The manufacture and use of the invention can also be carried out by numerous alternative methods such as by substituting a volatile fluid blowing agent foaming system for the saturated nitrogen foaming system.

The following examples demonstrate a few embodiments of the invention. All ratios are weight ratios unless otherwise indicated.

EXAMPLE 1

Styrene (5.0 g) which has been deoxygenated with nitrogen, was added to 100 ml of deoxygenated hexane. An initiator n-butyllithium (0.15 millimole) was added and the polymerization was allowed to continue for about thirty minutes. Trimethylvinylsilane (5.0 g) was then added. The polymerization was allowed to continue for several hours. Methanol was used to stop the reaction. The initiator residue was removed by water extraction. The solution was evaporated to leave a styrene-vinyltrimethylsilane diblock copolymer.

EXAMPLE 2

Example 1 is repeated with triethylvinylsilane. The product is a styrene-vinyltriethylsilane diblock copolymer.

EXAMPLE 3

A polystyrene/styrene syrup (80 weight percent styrene) (400 g) had styrene-vinyltrimethylsilane diblock copolymer (1.2 g) added. The resulting solution was stirred under a nitrogen atmosphere (100 psi) for about twenty minutes. n-Butyllithium (5.31 milliequivalents) in a hexane solution (3.0 ml) was then added and the solution was stirred 30 seconds. The solution was molded at atmospheric pressure. After curing for ninety minutes (65°–80° C.), the polymer was removed from the mold. The resulting foam had a density of about 0.7 g/cm$^3$ and fine cells.

EXAMPLE 4 (COMPARATIVE)

Example 3 was repeated without the styrene-vinyltrimethylsilane diblock copolymer. The resulting material had large holes and voids throughout the structure and exhibited considerable shrinkage.

EXAMPLE 5

Example 3 was repeated at a nitrogen pressure of 30 psi. The resulting material is a fine cell foam with a density of 0.82 g/cm$^3$.

EXAMPLE 6

Example 3 was repeated at a nitrogen pressure of 200 psi. The resulting material is a fine cell foam with a density of 0.53 g/cm$^3$.

EXAMPLE 7

A mixture of divinylbenzene (6.0 g), styrene (320 g), polystyrene (80 g), and styrene-vinyltrimethylsilane diblock copolymer (90 weight percent styrene) (1.2 g) was stirred for twenty minutes under nitrogen (100 psi). n-Butyllithium (5.31 milliequivalents) was added and the mixture was stirred for an additional thirty seconds. The mixture is molded in the atmosphere at atmospheric pressure. The mold is maintained at 100° C. for thirty minutes. The resulting very finely celled foam has a density of 0.64 g/cm$^3$.

EXAMPLE 8

A block copolymer of polybutadiene and polystyrene (72/28 by weight) (80 g) was added to styrene (320 g). Styrene-vinyltrimethyl silane diblock copolymer (90 weight percent styrene) (1.2 g) was added to the styrene mixture. This solution was stirred for twenty minutes under nitrogen (100 psi). n-Butyllithium (14.16 milliequivalents) was added and the mixture was stirred for thirty seconds. Then the mixture was molded at atmospheric pressure. The molding was cured for ninety minutes (81° C.). The resulting fine cell foam was very flexible and had a density of 0.55 g/cm$^3$.

EXAMPLE 9

Example 3 was repeated with a styrene-vinyltrimethylsilane diblock copolymer. The resulting fine cell foam had a density of 0.6 g/cm$^3$.

EXAMPLE 10

The ratio of trimethylvinylsilane to styrene in the block copolymer of 2000 g/mole molecular weight of Example 1 was varied and was used as a surfactant for styrene/polystyrene (80/20 by weight) in 1 weight percent concentration. The solution was stirred under nitrogen (100 psi) for twenty minutes. The pressure was then released and the percent change in volume from the fully foamed state relative to the state when the foam has dissipated was calculated. The results are summarized in Table 1.

TABLE 1

| Mole % Trimethylvinylsilane | Δ % Volume |
|---|---|
| 100 | 50 |
| 80 | 50 |
| 40 | 50 |
| 35 | 47 |
| 20 | 30 |
| 10 | 5 |

EXAMPLE 11

The molecular weight of a 10 mole fraction trimethylvinylsilane block copolymer prepared in the manner of Example 10 was varied and the percent change in volume is calculated as in Example 10. The results are summarized in Table 2.

TABLE 2

| Molecular Weight | Δ % Volume |
| --- | --- |
| 35,000 | 40 |
| 25,000 | 90 |
| 20,000 | 92 |
| 8,000 | 100 |
| 3,500 | 7 |

EXAMPLE 12

Example 3 was rerun and the nitrogen pressure was varied. The results are summarized in Table 3.

TABLE 3

| Nitrogen Pressure (psi) | Density g/cm$^3$ |
| --- | --- |
| 200 | 0.54 |
| 100 | 0.60 |
| 30 | 0.86 |

EXAMPLE 13

Example 3 was rerun and the stirring time was varied. The results are summarized in Table 4.

TABLE 4

| Stirring Time Minutes | Density g/cm$^3$ |
| --- | --- |
| 20 | 0.58 |
| 10 | 0.63 |
| 5 | 0.70 |
| 2 | 0.81 |

EXAMPLE 14

A mixture was prepared employing 320 grams of styrene having dissolved therein 90 grams polystyrene, 0.2 gram of divinylbenzene, 20 grams of normal pentane and 1.5 grams of block copolymer of styrene and trimethylvinylsilane as hereinbefore described. The mixture was stirred under a nitrogen atmosphere at a pressure of 100 pounds per square inch for a period of 20 minutes. On completion of the 20 minutes stirring, 3 milliliters of 1.77 normal butyl lithium in hexane were added and stirring continued for a period of 30 seconds. The mixture was transferred to a mold at atmospheric pressure. The mold had a rectangular cavity measuring 15.2 centimeters by 19.7 centimeters by 35 centimeters. The mold and contents were then placed in an oven having a temperature of 100 degrees centigrade for a period of 30 minutes. At the end of that period, mold and contents were removed from the oven and the rectangular foam article removed from the mold. The article replicated the internal dimensions of the mold and had a uniform fine celled structure. The resultant molded article was then placed in a hot air oven having a temperature of 135° centigrade to cause further expansion of the article. The resultant foam was tough, impact resistant and had a density of 3.2 pounds per cubic foot.

A wide variety of expanding agents may be utilized in the practice of the present invention. Such foaming agents are volatile fluid materials such as methane, ethane, propane, butane, pentane, nitrogen, helium, argon and the like. The foaming agents useful in the present invention are those that become gaseous at polymerization temperature and are chemically inert to a polymerization initiator such as an organolithium compound, for example n-butyllithium.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A compound of the following general formula

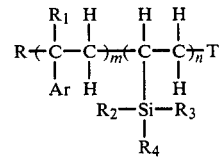

wherein Ar is selected from the group consisting of phenyl, alkyl substituted phenyl, naphthyl alkyl substituted alkyl groups wherein the alkyl substitution contains from 1 to 20 carbon atoms;

R is an alkyl radical containing 1–10 carbon atoms;

$R_1$ is hydrogen or methyl;

$R_2$, $R_3$, and $R_4$ are individually selected from the group consisting of alkyl and cycloalkyl groups varying from 1–10 carbon atoms, phenyl and alkyl or cyclo alkyl substituted phenyl;

m and n vary independently among the positive integers; and

T is the radical obtained from chain termination.

2. The compound of claim 1 wherein m varies among the integers between 90 and 270 and n varies among the integers between 10 and 30.

3. The compound of claim 1 wherein Ar is phenyl and $R_1$ is hydrogen.

4. The compound of claim 2 wherein Ar is phenyl and $R_1$ is hydrogen.

5. The compound of claim 1 wherein $R_2$, $R_3$ and $R_4$ are independently methyl.

6. The compound of claim 2 wherein $R_2$, $R_3$ and $R_4$ are independently methyl.

7. The compound of claim 1 wherein part of the general formula

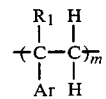

is replaced partially or wholly by block copolymer units of styrene and a conjugated diene.

* * * * *